United States Patent
Dong

(10) Patent No.: US 8,408,474 B2
(45) Date of Patent: Apr. 2, 2013

(54) METHOD FOR SPEEDING UP THE DETECTION AND THE ACTIVATION OF THE COMMUNICATION INTERFACE BETWEEN A TERMINAL AND A UICC

(75) Inventor: Olivier Dong, Barkshire (GB)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 12/444,088

(22) PCT Filed: Oct. 4, 2007

(86) PCT No.: PCT/JP2007/069475
§ 371 (c)(1),
(2), (4) Date: Apr. 2, 2009

(87) PCT Pub. No.: WO2008/044597
PCT Pub. Date: Apr. 17, 2008

(65) Prior Publication Data
US 2010/0035651 A1    Feb. 11, 2010

(30) Foreign Application Priority Data

Oct. 4, 2006 (EP) ..................................... 06121764

(51) Int. Cl.
*G06K 19/06* (2006.01)
(52) U.S. Cl. ... 235/492; 235/491; 235/449; 235/472.01; 235/472.03
(58) Field of Classification Search .................. 235/492, 235/441, 440, 380, 451
See application file for complete search history.

(56) References Cited

U.S. PATENT DOCUMENTS

| | | | | |
|---|---|---|---|---|
| 6,036,100 A | * | 3/2000 | Asami | 235/492 |
| 6,199,128 B1 | * | 3/2001 | Sarat | 710/301 |
| 6,578,768 B1 | * | 6/2003 | Binder et al. | 235/492 |
| 6,769,620 B2 | * | 8/2004 | Devaux et al. | 235/492 |
| 6,883,715 B1 | * | 4/2005 | Fruhauf et al. | 235/492 |
| 7,137,560 B2 | * | 11/2006 | Hammer | 235/462.39 |
| 7,900,830 B2 | * | 3/2011 | Tran | 235/380 |
| 2002/0065044 A1 | * | 5/2002 | Ito | 455/41 |
| 2002/0100798 A1 | * | 8/2002 | Farrugia et al. | 235/380 |
| 2005/0045720 A1 | * | 3/2005 | Fruhauf | 235/440 |
| 2006/0161594 A1 | * | 7/2006 | Chung | 707/200 |
| 2007/0200003 A1 | * | 8/2007 | Deprun et al. | 235/492 |

FOREIGN PATENT DOCUMENTS

CN    101025782 A    8/2007

(Continued)

OTHER PUBLICATIONS

Japanese Office Action dated Oct. 30, 2012 issued by the Japanese Patent Office in corresponding Japanese Patent Application No. 2008-538689.

(Continued)

*Primary Examiner* — Linh Nguyen
(74) *Attorney, Agent, or Firm* — Sughrue Mion, PLLC

(57) ABSTRACT

The invention relates to A method for speeding up the detection and the activation of the communication protocol used between a terminal (2) and a UICC (4) supporting at least one High Speed protocol (HSP).

The method according to the invention is characterized by providing the terminal (2) with information about the High Speed Protocol supported by said UICC (4) through the current interface prior to the communication with said UICC (4) through a HSP interface.

9 Claims, 1 Drawing Sheet

FOREIGN PATENT DOCUMENTS

| | | |
|---|---|---|
| JP | 2003-526128 A | 9/2003 |
| JP | 2003-288561 A | 10/2003 |
| JP | 2004-139244 A | 5/2004 |
| JP | 2004-240861 A | 8/2004 |
| JP | 2005-339141 A | 12/2005 |
| JP | 2008537375 A | 9/2008 |
| WO | 2006099466 A2 | 9/2006 |

OTHER PUBLICATIONS

Office Action, dated Oct. 22, 2012, issued by the State Intellectual Property office of the People's Republic of China in counterpart Chinese Application No. 200780037123.0.

* cited by examiner

METHOD FOR SPEEDING UP THE DETECTION AND THE ACTIVATION OF THE COMMUNICATION INTERFACE BETWEEN A TERMINAL AND A UICC

TECHNICAL FIELD

This application is based upon and claims the benefit of priority from EPC patent application No. 06121764.2, filed on Oct. 4, 2006, the disclosure of which is incorporated herein in its entirety by reference.

The present invention concerns a method for speeding up the detection and the activation of the communication protocol used between a terminal and a UICC supporting at least one High Speed protocol (HSP).

The invention concerns also a terminal associated with a UICC supporting at least one High Speed protocol.

BACKGROUND ART

The ETSI SCP standard body is currently discussing and defining a new optional High speed interface between a mobile terminal and the UICC (UMTS (Universal Mobile Telecommunications System) Integrated Circuit Card) comprising the USIM (Universal Subscriber Identity Module) application allowing the terminal to access the services provided by a telecommunication operator.

If such a High Speed interface is agreed, it would be included in the ETSI TS 102.221 (release-7 or release-8).

However, the current discussion does not define any technical solution which allows the terminal to detect the UICC High Speed interface capability from the current interface defined in ETSI TS 102.221.

Consequently, if the terminal tries to activate the UICC using directly a High Speed Protocol (HSP) interface, it will be facing at least two issues, a long interface activation time, and contact allocation issue.

The first issue arises from the fact that the HSP is an optional feature. Consequently, some UICCs may not support this interface. Consequently, if the terminal first starts the activation on the HSP interface, it may take a long time before it realizes that the UICC doesn't support the HSP.

As an example of this problem, if the HSP consists of a USB interface, the terminal should first power the UICC up with the lowest voltage class, and then wait at least 20 ms before assessing if a USB device is connected or not. If the terminal does not detect the presence of the USB device with the lowest voltage class, it has to do the sequence again with the next voltage class, and so on.

Currently, there are three defined voltage classes, that means if there is no USB device (UICC) detected after the 3 sequences, the terminal has wasted at least 60 ms (this delay represents only the minimum waiting time to which the processing time should be added) before starting the ISO (International Organization for Standardization) interface activation.

The second issue arises from the fact that the HSP supported by the UICC should live together with any future ME-UICC (Mobile Equipment-UICC) interfaces (e.g. contact-less).

Depending on the chosen technology, the number of contacts could be not sufficient to be used by only one interface. Moreover, it is not clearly defined yet in the standards which contacts will be used for the HSP and Contact-less. Consequently, if the terminal powers the UICC up without knowing exactly which contacts are allocated to the HSP, it could physically damage the UICC.

DISCLOSURE OF INVENTION

Problem to be Solved by the Invention

An object of the present invention is to overcome the above described drawback.

Means of Solution to the Problem

The invention provides a method for speeding up the detection and thus the activation of the communication protocol used between a terminal and a UICC supporting at least one High Speed protocol (HSP).

The method according to the invention consists in providing the terminal with information about the High Speed Protocol supported by said UICC through the current interface prior to the communication with said UICC through a HSP interface.

Said current interface is defined in ETSI TS 102.221 (based on ISO/IEC 7816 series).

Thanks to the invention, the terminal detects whether the UICC supports the HSP or not prior to any communication through the High Speed Interface. In particular, the terminal knows the contacts allocated to the HSP.

Therefore, once a HSP interface is detected the terminal can decide whether to activate the detected HSP or not depending on the communication context and needs (i.e. type of applications present in the terminal and UICC, the amount of data that need to be exchanged . . . ).

In a first exemplary embodiment of the invention, the detection of the HSP between the terminal and the UICC comprises the following steps:
- the terminal sends to the UICC a Reset signal through the ISO interface,
- in response to said Reset Signal, the UICC sends to the terminal an ATR (Answer To Reset) including information about the HSP supported by the UICC.

In a second exemplary embodiment of the invention, the terminal reads the information about the HSP supported by said UICC from a new dedicated Elementary File EFHSP previously defined in the UICC.

In a particular example of implementation of the first exemplary embodiment, the information about the HSP supported by said UICC are transmitted to the terminal within unused bytes of the ATR.

Preferably, said ATR comprises at least:
- indication whether a HSP is supported or not by the UICC,
- indication of the speed mode supported by the UICC;
- indication of the power consumption class of said UICC;
- indication of the HSP contacts allocation;
- indication of the contact-less interface contacts allocation;
- indication of the supported HSP services.

In a particular example of implementation of the second exemplary embodiment, the new dedicated Elementary File EFHSP is located under the Master File (MF) in the UICC.

Preferably, said new dedicated Elementary File EFHSP comprises at least:
- indication of the voltage class supported by the UICC;
- indication of the speed mode supported by the UICC;
- indication of the power consumption class of said UICC;
- indication of the HSP contact allocation;

indication of the contact-less interface Contact allocation;
indication of the supported services;
indication of any other HSP parameters.

The methods according to the invention provide a safe and speedy activation of the HSP interface supported by the UICC.

The forgoing summary, as well as the following detailed description, will be better understood when read in conjunction with the appended figures.

BEST MODE FOR CARRYING OUT THE INVENTION

Figure 1:
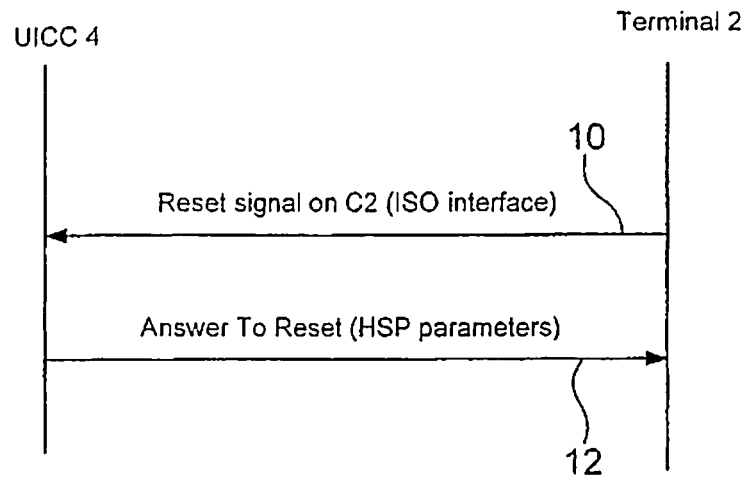
FIG. 1 represents a schematic diagram of a first exemplary embodiment of the invention.

FIG. 1 is diagram illustrating the initial steps in the communication between a terminal 2 and a UICC 4 prior to the selection of the communication interface protocol by said terminal.

It is to be noted that during these initial steps, the terminal and the UICC communicates through the current existing interface defined in ETSI TS 102.221 (based on ISO 7816 interface). Said UICC may only support one protocol (MMC (for Multimedia Memory Card) or USB (for Universal Serial Bus) or any other) or could be multi-protocols (possibly supporting both the USB and MMC for example).

In this example, in step 10 the terminal 2 sends to the UICC 4 a Reset Signal on the contact C2 of the integrated chip on the UICC 4.

In response to the Reset Signal, in step 12, the UICC 4 transmits to the terminal 2 an ATR (Answer To Reset) comprising parameters relating to its HSP capability that can not be known in advance if the terminal 2 directly tries to activate any HSP interface. Said parameters may be included in some currently unused Historical bytes of the ATR, T8 to T13 for example, that was reserved for future use. These bytes carry the needed High Speed Interface parameters such as voltage class, speed mode, power consumption, contact allocation, the contact-less interface contact allocation, the supported services . . . .

In a first and preferred implementation given below, it is assumed that the UICC 4 supports one protocol at a time (USB or MMC or any other).
Using T8 to T13 in historical bytes, the configuration of the HSP parameters is given below:
T8:
Bit 0=1: HSP supported
Bit 0=0: HSP not supported
Other bits: RFU (Reserved for Future Use)
T9: Voltage Class
bit 0, bit 1=00: voltage class A supported
bit 0, bit 1=01: voltage class B supported
bit 0, bit 1=10: voltage class C/C* supported
Bit 2 to 7: RFU
T10: Speed Mode
In USB Case:
bit 0, bit 1=00: Low Speed mode supported
bit 0, bit 1=01: High Speed mode supported
bit 0, bit 1=10: Full Speed mode supported
Bit 2 to 7: RFU
In MMC Case:
Bit 0=1: single data wire supported
Bit 0=0: RFU
Bit 1 to 7: RFU
T11: Power Consumption
Bit 0 to Bit 7: 0 to 255 (mA)
This parameter indicates the current (mA) the UICC wish to have for the High Speed interface operations. It is up to the terminal to allow or not such power consumption.
By default, both USB and MMC should be compliant with the power consumption as described in ETSI TS 102.221
The implementation examples given below for T12 and T13 are relevant if the ETSI SCP standard doesn't explicitly allocate the contacts for each interface.
T12: HSP Contacts Allocation
In case the UICC supports the USB interface:
Contact for D−:
    bit 0 bit 1=00: C4
    bit 0 bit 1=01: C6
    bit 0 bit 1=10: C8
Contact for D+:
    bit 2 bit 3=00: C4
    bit 2 bit 3=01: C6
    bit 2 bit 3=10: C8
bit 4 to 7: RFU
In case the UICC supports MMC interface:
Contact for CLK (Clock):
    bit 0 bit 1=00: C4
    bit 0 bit 1=01: C6
    bit 0 bit 1=10: C8
    bit 0 bit 1=11: C7
Contact for CMD (Command):
    bit 2 bit 3=00: C4
    bit 2 bit 3=01: C6
    bit 2 bit 3=10: C8
    bit 2 bit 3=11: C7
Contact for DATA
    bit 4 bit 5=00: C4
    bit 4 bit 5=01: C6
    bit 4 bit 5=10: C8
    bit 4 bit 5=11: C7
bit 6 to 7: RFU
T13: Contact-less Interface Contacts Allocation
Bit 0=0: contact-less not supported
Bit 0=1: contact-less supported
If SWP (Single Wire Protocol) (need 1 contact):
bit 1, bit 2=00: C4 allocated
bit 1, bit 2=01: C6 allocated
bit 1, bit 2=10: C8 allocated
bit 1, bit 2=11: C7 allocated
bit 3 to 7: RFU
if S2C (need 2 contacts):
    bit 1, bit 2, bit 3=000: C4 and C6 allocated
    bit 1, bit 2, bit 3=001: C4 and C7 allocated
    bit 1, bit 2, bit 3=010: C4 and C8 allocated
    bit 1, bit 2, bit 3=011: C6 and C7 allocated
    bit 1, bit 2, bit 3=100: C6 and C8 allocated
    bit 1, bit 2, bit 3=101: C7 and C8 allocated
    bit 4 to 7: RFU.

In the example given above, one byte only carries information for only one parameter (e.g. speed mode, voltage class, . . . ). But for optimization matters, one byte could carry information for several parameters.

In a second implementation of the invention, given below, the HSF parameters are stored in a new Elementary File EFHSP previously defined in the UICC. This new Elementary File includes the information about the HSP.

Compared with the use of the unused bytes of the ATR, the EFHSP provides more room to take into account the future increase of the number of the HSP parameters. As a matter of fact, new parameters that could be involved in the detection mechanism may be easily added in the EFHSP to take into account the future modifications of the HSP interface. On the other hand, using the EFHSP method would be a little bit slower than using ATR method.

Preferably, the EFHSP is defined under the Master File in the UICC so as to be immediately accessible to the terminal 2 after the current existing ISO interface activation and prior to any application selection (SIM (Subscriber Identity Module), USIM, ISIM (IM (IP Multimedia) Services Identity Module), ... )

A definition of the EFHSP is given below as an example:
EF type: transparent
Length: X bytes
Data coding: TLV (Tag Length Value) type
Tag OxA1: voltage class
Length: 1 byte
Data:
Same Coding as in Method 1
Tag OxA2: speed mode
Length: 1 byte
Data:
Same Coding as in Method 1
Tag OxA3: Power consumption class
Length: 1 byte
Data:
Same Coding as in Method 1
Tag OxA4: HSP Contact allocation
Length: 1 byte
Data:
Same Coding as in Method 1
Tag OxA5: Contact-less interface Contact allocation
Length: 1 byte
Data:
Same Coding as in Method 1
Tag OxB1: supported services
Length: Y byte
Data:
Bit 0 to 7:
0000 0001=Mass storage
0000 0010=Smart Card Web Server
0000 0011=video streaming deciphering by UICC
....
Tag 0xCl: other parameters
Length: Y byte
Data:
This part includes the other parameters that are exchanged if the UICC activation is done directly from the HSP interface.

The coding of these data are the same as defined in the latest USB (currently v2.0), MMC (currently v4.1) or any other specs related to the supported HSP.

Figure 2:
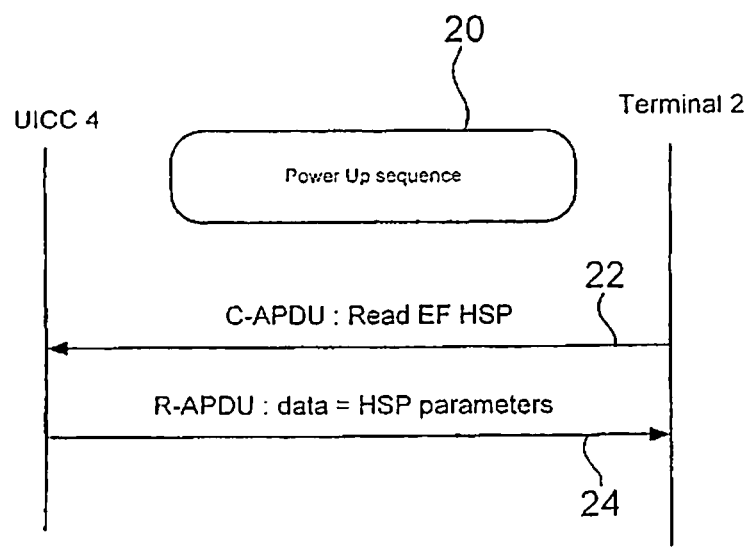
FIG. 2 represents a schematic diagram of a second exemplary embodiment of the invention.

Referring now to FIG. 2, after the initialisation sequence (step 20), in step 22, the terminal 2 sends to the UICC 4 a READ BINARY C-APDU (Command-Application Protocol Data Unit) specified in the ETSI TS 102.221, in order to get the content of EFHSP.

In response to the command C-APDU, the UICC 4 transmits to the terminal 2, in step 24, an R-APDU (Response-APDU) containing the HSP parameters.

It is to be noted that further parameters can be added in the EFHSP without departing from the scope of the invention.

The invention claimed is:

1. A Method for speeding up the detection and the activation of the communication protocol used between a terminal and a UICC (Universal-Mobile-Telecommunication-System Integrated Circuit Card) supporting at least one High Speed protocol (HSP), said method characterized by providing the terminal with information about the High Speed Protocol supported by said UICC through the current interface prior to the communication with said UICC through a HSP interface;
wherein the detection of the HSP between the terminal and the UICC comprises:
the terminal sends to the UICC a Reset signal through the ISO (International Organization for Standardization) interface,
in response to said Reset Signal, the UICC sends to the terminal an ATR (Answer To Reset), including information about the HSP supported by the UICC, and
the information about the HSP supported by said UICC is transmitted to the terminal within bytes of the ATR unused under ISO/IEC 7816.

2. Method according to claim 1, wherein prior to any application selection, the terminal reads the information about the HSP supported by said UICC from a new dedicated Elementary File EFHSP previously defined in the UICC.

3. Method according to claim 2, wherein said EFHSP is located under the Master File (MF) in the UICC.

4. Method according to claim 1, wherein said ATR comprises at least:
indication whether a HSP is supported or not by the UICC,
indication of the voltage class supported by the UICC;
indication of the speed mode supported by the UICC;
indication of the power consumption class of said UICC;
indication of the HSP contact allocation;
indication of the contact-less interface contact allocation;
indication of the supported services.

5. Method according to claim 3, wherein said new dedicated Elementary File EFHSP comprises at least:
indication of the voltage class supported by the UICC:
indication of the speed mode supported by the UICC;
indication of the power consumption class of said UICC;
indication of the HSP contact allocation;
indication of the contact-less interface contact allocation;
indication of the supported services;
indication of any other HSP parameters.

6. Terminal associated with a UICC (Universal-Mobile-Telecommunication-System Integrated Circuit Card), comprising a first detecting unit which detects whether the UICC supports an HSP (High Speed Protocol) interface or not,
wherein detection of the HSP between the terminal and the UICC comprises:
the terminal sends to the UICC a Reset signal through the ISO (International Organization for Standardization) interface,
in response to said Reset Signal, the terminal receives from the UICC an ATR (Answer To Reset), including information about the HSP supported by the UICC, and
the information about the HSP supported by said UICC is transmitted to the terminal within bytes of the ATR unused under ISO/IEC 7816.

7. Terminal according to claim 6, comprising a second detecting unit which detects the contacts allocated to the HSP interface and the contact-less interface supported by the UICC.

8. UICC (Universal-Mobile-Telecommunication-System Integrated Circuit Card) supporting at least one HSP (High Speed Protocol) interface associated with mobile equipment, wherein it comprises an ATR (Answer To Reset) which includes information about said HSP;
wherein detection of the HSP between the mobile equipment and the UICC comprises:

the mobile equipment sends to the UICC a Reset signal through the ISO (International Organization for Standardization) interface, in response to said Reset Signal, the UICC sends to the mobile equipment the ATR, including information about the HSP supported by the UICC, and the information about the HSP supported by said UICC is transmitted to the terminal within bytes of the ATR unused under ISO/IEC 7816.

9. Terminal associated with a UICC (Universal-Mobile-Telecommunication-System Integrated Circuit Card), comprising a first detecting unit which detects whether the UICC supports an HSP (High Speed Protocol) interface or not, wherein detection of the HSP between the terminal and the UICC comprises:

the terminal sends to the UICC a Reset signal through the ISO (International Organization for Standardization) interface, in response to said Reset Signal, the terminal receives from the UICC an ATR (Answer To Reset), including information about the HSP supported by the UICC, and the information about the HSP supported by said UICC is transmitted to the terminal within bytes of the ATR unused under ISO/IEC 7816.

* * * * *